United States Patent
Kyrtsos et al.

(10) Patent No.: US 6,405,109 B1
(45) Date of Patent: Jun. 11, 2002

(54) AXLE MISALIGNMENT METHOD FOR A VEHICLE

(75) Inventors: Christos Kyrtsos, Southfield; Jane Huang, Troy, both of MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/619,734

(22) Filed: Jul. 19, 2000

(51) Int. Cl.$^7$ .............................................. G01M 17/10
(52) U.S. Cl. ............................. 701/29; 701/37; 701/69
(58) Field of Search ............................ 701/29, 37, 69, 701/74; 73/1.75, 146; 356/139.09

(56) References Cited

U.S. PATENT DOCUMENTS 5,396,917 A * 3/1995 Rosenweig ................. 73/146.2
6,098,296 A * 8/2000 Perisho, Jr. et al. .......... 33/203

* cited by examiner

Primary Examiner—Yonel Beaulieu
(74) Attorney, Agent, or Firm—Carlson, Gaskey & Olds

(57) ABSTRACT

A method and system for determining axle misaligned and tire wear of a vehicle monitors lateral and vertical acceleration values. Lateral and vertical acceleration data for each axle is taken and this data is put into an equation. A ratio of the data for one axle divided by the data of another axle is calculated. If this ratio tends towards 1.0 the axles are more in alignment with respect to each other and there is likely less tire wear. As the ratio tends away from 1.0 the axles are more misaligned with respect to each other and there is likely more tire wear. The standard deviations of the vertical accelerations are also put into a ratio and can be used to predict how much wear the tires on one axle are experiencing as compared to the tires on the other axle. A gauge or monitoring device may be used to monitor the values to determine misalignment and predict tire wear. The monitoring device may send alignment and tire wear signals to a display, which indicates axle misalignment and tire wear of the vehicle.

13 Claims, 2 Drawing Sheets

AXLE MISALIGNMENT METHOD FOR A VEHICLE

BACKGROUND OF THE INVENTION

The invention relates to a method for determining axle misalignment and tire wear of a vehicle by monitoring acceleration values on the vehicle.

Modern vehicles have several spaced axles each attached to wheels. Sometimes the axles become misaligned relative to each other. For efficient operation, vehicles require aligned axles. When axles are misaligned, the wheel do not face forwardly, but instead are at an angle relative to the drive direction. Misaligned axles can result in premature tire wear and reduce the efficiency of the vehicle.

The adjustment of the axle and wheels generally involves adjusting the steering axle, the forward drive axle, and the rear drive axle in order to allow the tires to contact the road or ground at a correct angle.

Presently, to determine whether and how much axle alignment adjustment is necessary, a worker estimates or makes a determination of the axle and wheel misalignment. Typically, this has been done while the vehicle is stationary by visually inspecting axles. If the operator of the vehicle does not seek to have the axle position tested, there is no simple way to identify misalignment.

Also, tire wear is potentially a problem. To date, tire wear has also been determined visually.

Although the above methods of determining axle misalignment and tire wear have been used for years, they are time consuming and sometimes inaccurate.

SUMMARY OF THE INVENTION

In the disclosed embodiment of the invention, a method of determining vehicle axle misalignment and/or predict tire wear includes monitoring values such as lateral acceleration and vertical acceleration values of an axle in motion. The data is stored and used to predict tire wear and determine axle misalignment.

Essentially, when an axle is misaligned, there will be a lateral acceleration applied to the wheels on that axle that would not be experienced by a wheel on a properly aligned axle. By monitoring those accelerations, one can make a prediction of how much misalignment there may be for a particular axle. Also, vertical acceleration values can help to make this determination more accurate. The lateral and vertical acceleration values can also be utilized to determine the amount of force that a tire may experience over time, relative to other tires. That is, if a tire is on an axle that is more misaligned than another axle, one can predict the tire will wear more rapidly. By storing this information one can make a prediction of undue tire wear for a particular tire.

Further, in a different aspect of this invention, if one is monitoring vertical acceleration one can predict tire wear relative to the tire wear on another tire. By identifying a normal tire wear, and by weighing the tire wear on each monitored tire to account for any undue wear due to excess weight or axle misalignment, this invention provides a method of identifying excessive tire wear that would predict when one tire may have worn more rapidly than the other tires on the vehicle.

This invention preferably monitors lateral and vertical acceleration over time on each axle. The mean of this data is then taken. A ratio of the mean lateral acceleration data of one axle divided by the mean lateral acceleration data of the other axle is then calculated. Preferably, the mean value is defined by dividing the sum of monitored values by the number of monitored values for a predetermined duration. This ratio of the means is multiplied a ratio of the same respective axle standard deviation of the vertical acceleration data. This final ratio, which is a product of the standard deviation ratio of the vertical acceleration data and the mean lateral acceleration ratio, is now a direct indication of the work done by lateral forces on the tires. If this final ratio approaches "1.0" the axles are more aligned. As the ratio of the data tends away from "1.0" the more misaligned the axles are. If they are perfectly aligned then the ratio should converge to "1.0". The farther the ratio value is from the number "1.0" the more energy one axle is experiencing as compared to the other axle and therefore the more work done by the tires on that axle. If the ratio is higher than "1.0" it can be said that the first axle is "more" out of alignment than the second. If the ratio is less than "1.0" it can be said that the second axle is more out of alignment than the first axle. If a threshold ratio value is exceeded a signal can be sent to the operator that the axles are out of alignment.

One can also experimentally determine tire wear by storing how bad the axles are misaligned over time. Again, a tire on an axle which is misaligned will tend to experience more wear. The amount of additional wear can be determined experimentally for a given amount of axial misalignment over a given distance and weight. The present invention can then predict tire wear for a tire on an axle having the sensed misalignment, weight and distance. One other way to predict tire wear of one axle as to another axle is to use the standard deviations of the vertical acceleration data alone.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1A:
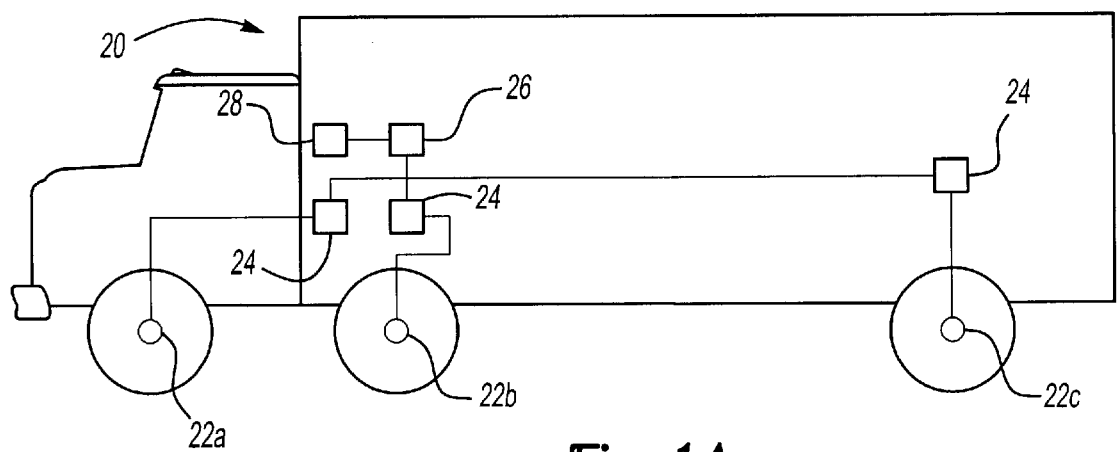
FIG. 1A schematically shows one system incorporating the present invention.
Figure 1B:
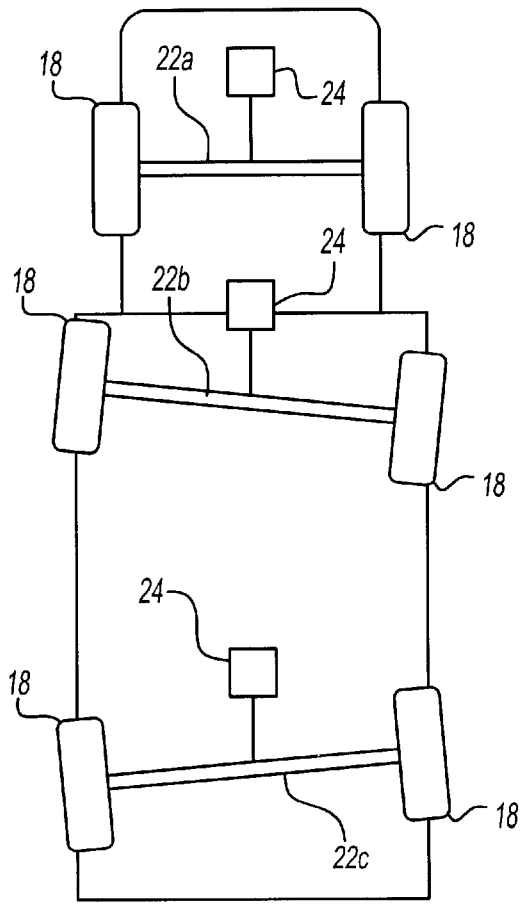
FIG. 1B schematically shows an axle misalignment situation.

FIG. 1A shows a vehicle 20, which may be a tractor/trailer combination, incorporating the present invention. One feature of this invention involves monitoring characteristics or values of axles 22a,22b,22c shown in FIG. 1B, while vehicle 20 is in motion, to determine axle 22a, 22b, 22c misalignment. As shown in FIGS. 1A and 1B, the method involves using gauges or monitoring devices 24 on each axle 22a, 22b, 22c, a control 26 and a display 28 mounted in the vehicle 20 cab, and visible to the vehicle 20 operator.

As shown in FIG.1B, the wheels 18 of a vehicle 20 are attached to axles 22a,22b,22c. Two axles 22b,22c are shown misaligned to an exaggerated amount. Applicant has determined that by monitoring the lateral acceleration values on an axle 22a,22b,22c over a period of time, an indication of the amount of axle 22a, 22b, 22c misalignment and tire wear can be made. This is because an out of alignment axle 22a, 22b, 22c will experience more forces than an axle that is in alignment. By monitoring lateral accelerations and vertical accelerations applicant can determine how much energy is being put into an axle.

Figure 1C:
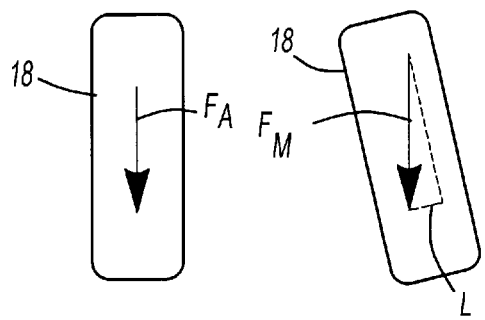
FIG. 1C shows a force explanation.

Once basic feature of this invention can be understood by a brief review of FIG. 1C. As shown in FIG. 1C, a tire on an aligned axle is compared to a tire on a misaligned axle. The misaligned axle is shown at an exaggerated angle. The force $F_A$ on the aligned tire is generally along the direction of travel. However, the force $F_M$ on the misaligned axle will have a lateral component L which deviates from the direction of travel. This lateral component will apply a lateral acceleration to the axle. Further, as can be appreciated from this drawing this lateral component will be responsible for additional tire wear relative to the tire on the aligned axle.

Figure 2:
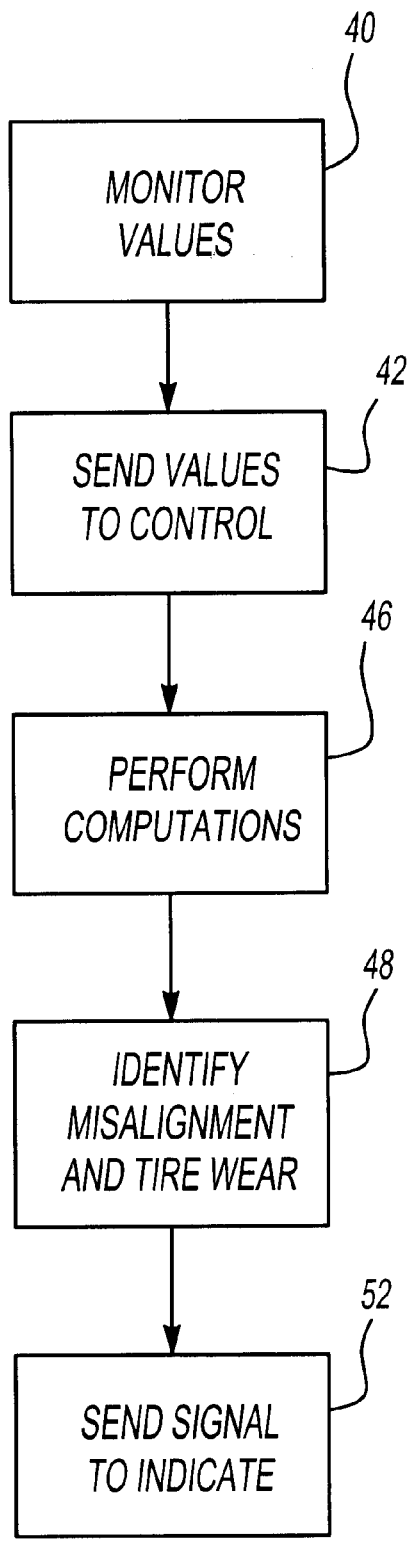
FIG. 2 is a flow chart of the present invention.

A system may be used to perform the method shown in the flow chart of FIG. 2. This method could be described as monitoring values of an axle (40), sending value signals representing the monitored values to a control (42), performing computations on the monitored values (46) identifying axle misalignment and tire wear based on the computations (48), sending axle misalignment and tire wear signals to a display, and indicating axle misalignment and tire wear in step (52).

The monitoring devices 24 are shown schematically in FIG. 1A associated with the vehicle 20. In a preferred embodiment, the monitoring devices 24 monitor lateral and vertical acceleration values. The monitoring devices 24 then send signals 30 representing the values to control 26.

The monitoring devices 24 may be any suitable device known in the art, which can monitor acceleration values and send signals that represent the values. For example, the monitoring device 24 may be an accelerometer, as is known in the art. Additionally, the medium for sending signals to control 26 that represent the monitored values may be hard wired or use any suitable medium such as radio frequency.

The control 26 receives the value signals 30 from the monitoring devices 24, performs computations based on the monitored values, and identifies axle misalignment based on a product of two ratios of data from each axle and also predicts tire wear based on the degree of misalignment. The two ratios multiplied together represent the energy and work input to each axle 22a, 22b, 22c. Energy is work per unit time. The equation used is an energy equation, which is as follows: Work is equal to Force multiplied by distance and Force is equal to mass or weight multiplied by acceleration. The ratio of the standard deviations of the vertical acceleration values is proportional to the ratio of the weight on each axle 22a, 22b, 22c, the standard deviations can be substituted for the weight values in the equation Work equals mass multiplied by acceleration multiplied by distance. Since over time the amount of distance traveled be each axle 22a, 22b, 22c will be the same, the distance values factor out of the equation. Then after substituting in the standard deviations for weight the remaining energy equation includes the ratio of the standard deviations multiplied by the mean lateral acceleration values. That then determines the amount of energy input to each axle 22a, 22b, 22c.

Over a certain amount of time, for example over a long trip, if the axle is perfectly aligned the amount on energy and therefore the amount of work performed by the tires on each axle should be the same. If the axle is not in alignment then the amount of energy input to each axle and the amount of work done by the tires on those axles will be different. In this invention, misalignment is determined by the energy ratio previously calculated. The invention could also be used by comparing the values over several periods of time to get to a ratio. As the ratio tends away from "1.0" the axle is more out of alignment with respect to each other. As the ratio tends towards "1.0" the axles are more in alignment with respect to each other. If the ratio is greater than "1.0" it can be said that the first axle is more out of alignment with respect to the second axle and if the ratio is less than "1.0" it can be said that the second axle is more out of alignment with respect to the first axle. That is because the axle experiencing the greatest lateral accelerations or forces on it will have a greater energy value. As explained with regard to FIG. 1C, the more misaligned the axle, the greater the lateral acceleration. The amount of tire wear of one axle compared to the other may then be determined. The control 26 sends display 28 signals to indicate any axle misalignment and predict existing and future tire wear of the vehicle 20. While display 28 may be an operator display, the "display" could also be provided by a storage device which could be queried from time to time.

The control 26 may be any suitable device known in the art which can receive signals, perform computations based on the monitored values, and identify axle misalignment and tire wear. For example, a central processing unit such as a computer that is programmable to perform such tasks may be used. Furthermore, display 28 may be any suitable device known in the art that can receive signals and indicate axle 22a,22b,22c misalignment status. For example, a computer monitor, an LED, or a sound emitting device may be used.

Monitoring devices 24 may monitor lateral and vertical acceleration values of the steering axle 22a, forward drive axle 22b, and rear drive axle 22c while the vehicle 20 is moving. As shown in FIG. 1B, this may be achieved by attaching the monitoring devices 24 by any suitable means to a steering axle 22a, a forward drive axle 22b, a rear drive axle 22c, and when a vehicle 20 is in motion, measuring the net force against each axle caused by the respective misalignment. This may be done continuously over a predetermined duration for computation and comparison purposes as described below.

The monitoring devices 24 send signals 30 representing the lateral acceleration values to control 26. The monitoring devices 24 may also measure other values, and send signals representative of the respective values. Of course, the devices can be those used for sending other information to the control 26.

The control 26 receives the signals 30 and performs computations with the monitored lateral and vertical acceleration values of each monitored axle. For example, with the lateral acceleration values, the control 26 may compute the mean of the lateral acceleration values and standard deviation of the vertical accelerations of the steering axle 22a, forward drive axle 22b, and rear drive axle 22c in order to compare results as described below.

As is known in the art, a mean value is defined by dividing the sum of monitored values by the number of monitored values for the predetermined duration. As it is also known in the art, a standard deviation value is a quantity which represents the spread of the distribution of values.

A control 26 may then compare the ratio of the computations with the expected values that pertain to and are indicative of a specific axle misalignment of the vehicle 20 in question. Expected values may previously be stored in the control 26. For example, expected values may include a range of values which represent axle misalignments that are "misaligned", "partially misaligned", and "aligned", etc. However, it is to be noted that any other suitable value indicative of a specific wheel alignment may be used.

To compare the values, a look-up table can be stored within the control 26. The look up table can be developed experimentally for the axle misalignment. Thus, a test axle can be put into various degrees of misalignment and acceleration forces could be read on this axle. This would allow the control 26 to compare the monitored values to these previously stored values and predict the amount of axle misalignment.

One can determine the amount of tire wear by experimentally determining how much tire wear will occur on tires on one axle relative to tires on another axle given a predetermined amount of misalignment. The invention then stores the distance and weight that a particular tire has been driven with a misaligned axle, and that is stored as an amount of excessive tire wear for that particular tire. By adding this excessive tire wear to a nominal amount of tire wear for a given properly aligned axle one can make a prediction of when a particular tire may wear relative to a normal tire.

Further, by simply monitoring vertical acceleration one can determine tire wear without making any determination of axle misalignment. However, such a method may not be as precise. Vertical accelerations are mainly the result of going over potholes and bumps on the road. The mass or the weight on each axle will effect the vertical acceleration, because the mass or weight applies a force on the axle in the vertical direction. In one embodiment of this invention, a ratio of the standard deviations of these vertical accelerations is utilized to make axle to axle comparisons, and a tire wear prediction can then be made by assuming that an axle with great vertical accelerations will have tires that are undergoing excessive wear relative to another axle. The ratio of standard deviation of vertical accelerations of one axle divided by the standard deviation value of another axle can be utilized to predict this tire wear. For example, if the standard deviation of axle x divided the standard deviation of axle y equals 1.5, then axle x has tires which experience 50% less wear relative to axle y.

The amount of wear to be associated with the particular monitor the force can be determined experimentally. Using the standard deviations of the vertical acceleration data alone will only tell how much wear there is on one axle as compared to another. Thus, this is not as accurate enough of predicting the tire wear as a method which utilizes both lateral and vertical accelerations.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of determining axle misalignment of a vehicle comprising:

(a) monitoring a value applied to an axle while a vehicle associated with the axle is being driven and is in motion; and (b) using said monitored value for identifying axle misalignment.

2. A method as in claim 1, wherein a plurality of monitored values are taken.

3. A method of determining axle misalignment of a vehicle comprising:

(a) monitoring an acceleration value of an axle in motion; and (b) using said monitored value for identifying axle misalignment.

4. A method as in claim 1, wherein step (a) includes monitoring a vertical acceleration value of an axle and a lateral acceleration value.

5. A method as in claim 4, wherein acceleration data of plural axles are used to determine misalignment.

6. A method as in claim 5, wherein the standard deviations of the vertical acceleration data of each axle is calculated.

7. A method as in claim 5, wherein the mean lateral acceleration values for each axle is calculated.

8. A method as in claim 7, wherein a final ratio is calculated.

9. A method as in claim 8, wherein said final ratio is calculated by comparing computations on said monitored values of one axle to monitored values of a second axle.

10. A method of determining axle misalignment of a vehicle comprising:

(a) monitoring a vertical acceleration value of plural axles and a lateral acceleration value;

(b) calculating mean lateral acceleration values for each axle;

(c) a final standard deviations ratio being calculated by comparing computations on said monitored values of one axle to monitored values of a second axle; and (d) said mean lateral acceleration ratio is multiplied by said standard deviations ratio to determine said final ratio, and using said ratio for identifying axle misalignment.

11. A method as in claim 10, where a difference between said final ratio and the number 1.0 is evaluated.

12. A method as in claim 11, wherein said difference is used to predict a degree of axle misalignment and tire wear by comparison against experimentally predetermined values.

13. A method as in claim 6, wherein the standard deviations ratio is also used to predict tire wear of one axle as compared to another axle.

* * * * *